US 11,085,416 B2

(12) United States Patent
Thomsen

(10) Patent No.: US 11,085,416 B2
(45) Date of Patent: Aug. 10, 2021

(54) ELECTRICAL PITCH CONTROL SYSTEM AND A METHOD FOR OPERATING AT LEAST ONE ROTOR BLADE AND USE OF THE SYSTEM FOR PERFORMING THE METHOD

(71) Applicant: DEIF A/S, Outrup (DK)

(72) Inventor: Jesper Thomsen, Outrup (DK)

(73) Assignee: DEIF A/S, Skive (DK)

( * ) Notice: Subject to any disclaimer, the term of this patent is extended or adjusted under 35 U.S.C. 154(b) by 102 days.

(21) Appl. No.: 16/076,796

(22) PCT Filed: Mar. 14, 2017

(86) PCT No.: PCT/EP2017/055949
§ 371 (c)(1),
(2) Date: Aug. 9, 2018

(87) PCT Pub. No.: WO2017/157912
PCT Pub. Date: Sep. 21, 2017

(65) Prior Publication Data
US 2019/0048850 A1    Feb. 14, 2019

(30) Foreign Application Priority Data
Mar. 16, 2016   (DK) .......................... PA 2016 00163

(51) Int. Cl.
*F03D 7/02*        (2006.01)
*F03D 7/04*        (2006.01)

(52) U.S. Cl.
CPC .......... *F03D 7/0224* (2013.01); *F03D 7/042* (2013.01); *F05B 2220/30* (2013.01);
(Continued)

(58) Field of Classification Search
CPC .......... F03D 7/0224; F03D 7/042; F03D 7/04; F03D 7/0204; Y02E 10/723;
(Continued)

(56) References Cited

U.S. PATENT DOCUMENTS 7,972,112 B2 *   7/2011  Melius ...................... F03D 7/02
                                                         416/44
2004/0151577 A1 *  8/2004  Pierce ................... F03D 7/0204
                                                         415/4.1
(Continued)

FOREIGN PATENT DOCUMENTS

EP    1835293 A1 *   9/2007  ................ G01P 3/22
EP    2690286         1/2014
(Continued)

OTHER PUBLICATIONS

International Search Report issued in PCT/EP2017/055949 dated Jun. 14, 2017 pp. 1-3.
(Continued)

*Primary Examiner* — J. Todd Newton
(74) *Attorney, Agent, or Firm* — Jeffrey S. Melcher; Melcher Patent Law PLLC

(57) ABSTRACT

Pitch control system (1) for at least one rotor blade (17) for a wind turbine comprising a nacelle (16), as well as a hub (15) both place on the top of a tower (18) and at least one rotor blade (17). The system comprises at least one electrical pitch drive system (3) each drive system (3) is connected to a rotor blade (17) and an electrical pitch motor (2). The electrical pitch drive system(s) (3) is/are adapted to communicate with units comprising the motor(s) (2) for pitching the rotor blade (17) it is attached to and in accordance with inputs registered from a first sensor and a second sensor (20). Each electrical pitch drive system (3) comprises a gyroscope (22) adapted to register an angle value of the longitudinal axis of the rotor blade (17) with respect to the (Continued)

gravity. A processor is adapted to calculate the position of the rotor blade (17) based on said values.

14 Claims, 6 Drawing Sheets

(52) U.S. Cl.
CPC ..... *F05B 2260/74* (2013.01); *F05B 2270/309* (2013.01); *F05B 2270/326* (2013.01); *F05B 2270/328* (2013.01); *F05B 2270/602* (2013.01); *F05B 2270/807* (2013.01); *Y02E 10/72* (2013.01)

(58) Field of Classification Search
CPC ............ F05B 2220/30; F05B 2270/309; F05B 2260/74; F05B 2270/326; F05B 2270/328; F05B 2270/602; F05B 2270/807
USPC .............................. 416/157 R, 31, 44, 47, 48
See application file for complete search history.

(56) References Cited

U.S. PATENT DOCUMENTS

| | | | | |
|---|---|---|---|---|
| 2004/0151584 | A1* | 8/2004 | Blakemore | F03D 7/0224 416/9 |
| 2006/0140761 | A1* | 6/2006 | LeMieux | F03D 7/042 416/61 |
| 2007/0182162 | A1* | 8/2007 | McClintic | F03D 17/00 290/55 |
| 2008/0069692 | A1* | 3/2008 | Oohara | F03D 7/0224 416/31 |
| 2009/0004005 | A1* | 1/2009 | Jeppesen | F03D 7/024 416/44 |
| 2012/0134807 | A1* | 5/2012 | Axelsson | F03D 7/0224 416/1 |
| 2014/0020465 | A1 | 1/2014 | Laurberg | |
| 2014/0037448 | A1* | 2/2014 | Fu | F03D 7/0224 416/1 |
| 2015/0005966 | A1* | 1/2015 | Gerber | F03D 7/02 700/287 |
| 2015/0118047 | A1* | 4/2015 | Yoon | F03D 7/046 416/1 |
| 2015/0355044 | A1* | 12/2015 | Cardinal | G01H 1/003 73/455 |
| 2016/0138571 | A1* | 5/2016 | Perley | F03D 17/00 702/43 |
| 2016/0356266 | A1* | 12/2016 | Koerber | F03D 17/00 |
| 2019/0072071 | A1* | 3/2019 | Hammerum | F03D 7/047 |
| 2019/0226457 | A1* | 7/2019 | Bertolotti | F03D 17/00 |
| 2020/0025171 | A1* | 1/2020 | Danielsen | F03D 7/042 |

FOREIGN PATENT DOCUMENTS

| | | | |
|---|---|---|---|
| EP | 2693049 | 2/2014 | |
| EP | 2896827 A1 * | 7/2015 | ............... F01D 5/12 |
| WO | WO-2010139613 A2 * | 12/2010 | ........... F03D 7/0296 |
| WO | 2011/134473 | 11/2011 | |

OTHER PUBLICATIONS

Written Opinon issued in PCT/EP2017/055949 dated Jun. 14, 2017, pp. 1-8.
Dennis Horwitz: "Sensing the Motion", Aug. 1, 2010 (Aug. 1, 2010), pp. 27-31, XP055378089, Retrieved from the Internet: URL:http://www.micronor.com/products/files/MICRONOR ARTICLE Sensing the Motion-Rotary Positon Sensors-Electromechanical, Electronic aqnd Fiber Optic [PTE Aug. 2010] Micronor pgs.
Marx, "Symetrical Components 1 & 2," 28th Annual Hands on Relay School, Mar. 12-16, 2012, Washington State University, Pullman, Washington, pp. 1-32.
https://en.wikipedia.org/wiki/Symmetrical_components, pp. 1-6.
S. Vørts, "Elektronisk fordelingsanlæg," 1973 Polyteknisk Forlag, chapter 2, p. 43-56, machine translation submitted.

* cited by examiner

ELECTRICAL PITCH CONTROL SYSTEM AND A METHOD FOR OPERATING AT LEAST ONE ROTOR BLADE AND USE OF THE SYSTEM FOR PERFORMING THE METHOD

The present invention relates to an electrical pitch control system for controlling at least one rotor blade for a wind turbine said wind turbine comprising a nacelle, as well as a hub both placed on the top of a tower, said hub is adapted to rotate around an axis, and at least one rotor blade is pivotable mounted on the hub, said system comprising at least one electrical pitch drive system, each drive system connected to a rotor blade and an electrical pitch motor; the electrical pitch drive system(s) and the motor(s) are placed in the hub, said electrical pitch drive system(s) is/are adapted to communicate with units comprising the motor(s) for pitching the rotor blade it is attached to and in accordance with inputs registered from a first sensor (rotor gyroscope) and a second sensor (rotor sensor), and said electrical pitch control system further comprises at least one gyroscope.

The present invention also relates to a method for operating at least one rotor blade for a wind turbine said wind turbine comprising an electrical pitch control system, a nacelle, as well as a hub both placed on the top of a tower, said hub is rotating around an axis, and at least one rotor blade is pivotable mounted on the hub, said electrical pitch control system comprises at least one electrical pitch drive system each connected to a rotor blade and an electrical pitch motor; wherein the electrical pitch drive system(s) and the motor(s) are placed in the hub, said electrical pitch drive system(s) controls the motor(s) for pitching the rotor blade and in accordance with inputs registered from a first sensor and a second sensor and said electrical pitch control system further comprises at least one gyroscope.

The invention also relates to use of the electrical pitch control system for performing the method.

The rotor blades of a wind turbine is operated by an electrical pitch system, this is also called pitch operation. An electrical motor is the actuator moving each individual blade. A typical wind turbine has three rotor blades, whereas the numbers of individually operated motors are three. The electrical pitch system is also interfacing to the nacelle electrical system, wherefrom it receives a number of set points for the pitch and the electrical power to operate the motors/blades.

There are two main features for the pitch system, one is the normal operation, where the pitch is used to optimize the lift of the rotor blade in all wind situations, and the other is the main brake of the wind turbine. This brake function is simple as the rotor blade is moved from the operation point (from 0° to 30° depending on the actual average wind speed) to vane position, this is 90°.

As the pitch system is the only brake for the wind turbine, the three motors have to be controlled individually and independently from each other. This setup forms a "two out of three redundant system", which is allowed due to the wind turbine design-specifications.

The case where the electrical power supply to the wind turbine is interrupted, called black outs, or for shorter power cuts—where the grid is reestablish fast (<1 second)—called brownouts, are critical for the electrical pitch system. To prevent the pitch system from stopping during grid cutouts, a backup power is put into the pitch system. Typically, this can be based on lead acid batteries, Lithium type batteries or the newest technology: UltraCaps.

The demand for performance level (ISO 13849) is very high for pitch systems. The drives need a very high level of internal surveillance but also an internal communication between the three drives, as no sleeping errors are allowed. If an error appears in one of the three pitch subsystems, the two subsystems have to move the motor until the blade reaches vane position. This kind of redundancy is according to ISO13849 called; 2 out of three. For each of the three pitch drives, the pitch angle is measured redundantly. In the known technology this is done by a resolver/encoder on the motor shaft mentioned a second sensor, and an encoder on the blade rod—comprising a tooth wheel—mentioned a first sensor.

One of the future issues that needs to be solved in order to optimize the wind turbine operation is the position sensing of each individual blade. This position sensing is the first obstacle to make a control system that can optimize the load of the total turbine, hence reducing the mechanical structure. The position sensing here is used for reducing the load of the blade on wake effect. The wake effect appears when the blade passes the tower, as turbulence is making the aerodynamic life unstable. The result of the wake is an additional load on the blade, which can be reduced by pitching the blade as it passes the tower.

WO10139613 A2 discloses a technology for protecting a wind turbine tower from extreme loads, e.g. during an emergency stop or to ensure safe operation in the event of a functional failure of a nacelle-housed control system. The wind turbine comprises a hub-sited control circuitry arranged in a hub section of the wind turbine, the hub section supporting the rotor blades. A measurement unit is provided in the hub section for determining at least one parameter, such as an acceleration of a component of the wind turbine, a load of a component of the wind turbine, or a rotational speed of the rotor or the turbine shaft. The hub-sited control circuitry is configured to determine a load, acceleration, velocity or deflection of the tower or a wind turbine blade based on the at least one parameter measured by the measurement unit. Further, it is configured to control the wind turbine based on the determined load, deflection, velocity, or acceleration of the tower or blade and a desired value for said load, deflection, velocity or acceleration. However, the control system is not able to determine the angle between the gravity vector and the longitudinal axis of the blade.

EP2896827 describes a pitch control system for providing a measuring system for determining at least the pitch angle of the blades relative to the turbine hub. It comprises gyroscopes placed on each rotor blade. As the gyroscopes are located on the blades, they are highly vulnerable to influences such as wind and negative pressure resulting from tower wake effect. This will cause turbulence and will allow the registration of the gyroscopes to be noise affected, thereby making the measuring inaccurate causing the determination of the pitch angle to be inaccurate as well.

It is an object with the present invention to provide a system and a method providing an effective and clear specification of a rotor position or at least to provide a useful alternative to the known technology.

According to a first aspect of the invention an electrical pitch control system as described in the introduction is provided where each electrical pitch drive system comprises the gyroscope being placed in the hub and placed in a fixed distance to the axis of rotation of the hub, said each electrical pitch drive system(s) and gyroscope rotate with the rotation of the rotor blades and the rotation of the hub around the axis, and thus the gyroscope is adapted to register an angle value of the longitudinal axis of the rotor blade with respect to earth gravity, and a processor is adapted to calculate the position of the rotor blade based on said values.

According to a further aspect of the invention a method for operating at least one rotor blade as described in the introduction is provided where the gyroscope(s) is/are placed in the hub and placed in each of the electrical pitch drive systems and each in a fixed distance to the axis of rotation of the hub and thereby being an integrated part of each electrical pitch drive system, and when the rotor blade(s) rotate, the hub is rotating, whereby the electrical pitch drive system(s) and the gyroscope(s) are rotating in a fixed distance to the axis of rotation of the hub, by which rotating the gyroscope(s) indicates a direction of the rotor blade with respect to earth's gravity and whereby the electrical pitch control system is detecting a direction/ position of the center axis of the rotor blade with respect to the tower parallel with the gravitational vector.

Hereby is achieved that a rotor blade position with respect to the vertical is determined. Thus, it is possible to control the blade pitch more accurate according to the wind/turbulence situation since it is thus possible to take into account the tower wake effect, for example. This situation gives turbulence, which is compensated by pitching the rotor blade. The signal of a gyroscope is a very reliable signal.

By the expression that a detecting takes place is to understand that, a processor based on angle values received from the gyroscopes calculates the position of the rotor blade in question and in relation to the tower; that is in relation to the gravitational vector.

By the expression that a rotor blade is pivotable mounted on the hub is to understand that the rotor blade is pitchable/ rotatable around the longitudinal axis of the rotor.

The gyroscope is an integral part of the electrical pitch drive system and immovable in relation to this. The gyroscope rotates with the electrical pitch drive system positioned immovably in the hub and rotates with the hub about its axis of rotation. The electrical pitch drive system is NOT fixed to the rotor blade, so the blade movements are not part of the gyroscope records.

The hub rotates, of course, together with the rotor blades as the rotor blades are fixed to the hub, but the deflection of the blades due to wind load and the pitch of the rotor blades will not be recorded by the gyroscopes. Because the gyroscope is positioned as it is, a more accurate positioning of the rotor blades takes place. There is less noise. The protected location makes the control of the rotor blades more accurately. In the high-precision registration, it is possible to more accurately pitch the blades and, inter alia, take into account the "tower wake effect".

According to another aspect of the invention the wind turbine comprises several rotor blades advantageously 3 rotor blades, and a gyroscope is placed in each electrical pitch drive system which is connected to each his rotor blade and is adapted to register the angle values of the connected rotor blades in relation to earth gravity, and that the processor is adapted to calculate the angular position of each of the blades based on said values.

The three rotor blades are placed 120° from each other.

According to another aspect of the invention the electrical pitch control system comprises a communication bus system adapted to gather values of each angle registered between gravity and the center axis of the rotor blade received from the gyroscope connected to the rotor blade in question and the difference between the received values is determined by an algorithm, and a processor is adapted to calculate an angular position of each rotor blades in relation to the neighboring rotor blades.

Thus, it is possible to filter disturbances like tower oscillations. Thereby a more accurate position indication for each rotor blade position is achieved.

According to another aspect of the invention each electrical pitch drive system comprises an accelerometer adapted to register the acceleration of the rotor blade it is connected to.

A gyroscope is unfortunately constructed in such a way that it drives during the use hereof whereby the measurement over time may be inaccurate. By incorporating an accelerometer, it is possible to compensate for this during the interaction between the accelerometer and the gyroscope.

According to another aspect of the invention the first sensor comprises at least one gyroscope attached immovably to each of the rotor blades.

Hereby it is achieved that the pitch position/angle of each rotor blade is determined very exactly. Further, the interaction between the gyroscopes advantageously placed at the rod of the blade and the gyroscope placed in the drive system makes it possible to calibrate the gyroscopes and thereby calibrate the blade position.

Further, the gyroscope placed at the rotor blade makes it possible to eliminate the encoder placed in relation to the pitch tooth wheel. Thereby the pitch measuring and the regulating of the pitching is more precise as this mechanical element—the encoder that comprises a minor tooth wheel that interacts with the pitch tooth wheel—is avoided.

The encoder which is connected to the gear wheel is a relatively precise component but due to its construction and way of operation it must be placed fixed on an area of the nacelle. It detects the pitch angle by detecting a small tooth wheel engaging in the pitch tooth wheel, which is coupled to the rotor blade shaft in order to pitch that. This mechanical design leads to some backlash in the registration of pitch angel for each rotor blade. Thus, an inaccuracy in the correction of the pitch angle occurs, as this correction is a function of the measured pitch angle.

According to another aspect of the invention the first sensor comprises at least one accelerometer attached immovably to each of the rotor blades.

The gyroscope(s) placed on the blade may drift. The interaction between the accelerometer and the gyroscope(s) placed at the rotor blades makes it possible to compensate for this drift.

According to another aspect of the invention the first sensor (rotor gyroscope) and the second sensor (rotor sensor) are each adapted to detect data of the pitch angel of the rotor blade to which they are connected, and that the electrical pitch drive system is adapted to change the pitch angle by controlling the motor when the data from the first sensor is different from the data from the second sensor.

According to another aspect of the invention the first sensor is located on the rotor blade shaft in the area near the hub.

According to another aspect of the invention the electrical pitch control system comprises a plurality of gyroscopes attached immovable to a rotor blade and placed with a certain distance between them and in the entire length of the blade.

According to another aspect of the invention a force vector of a first rotor blade is 120° offset with respect to a force vector for a second rotor blade which is 120° offset with respect to a force vector of a third rotor blade.

According to another aspect of the invention each electrical pitch drive system is placed stationary in the hub and the gyroscope is placed stationary in the electrical pitch drive system and is an integrated part of the electrical pitch drive system.

The hub is rotating around an axis and the electrical pitch drive system and the gyroscope placed in the electrical pitch drive system are rotating around the same axis together with the hub.

By stationary is to understand that the electrical pitch drive system is immovable in relation to the hub and the gyroscope is immovable in relation to the electrical pitch drive system and thereby the hub.

As stated above the invention also relates to a method and as recited in the claims.

According to another aspect of the invention the wind turbine comprises several rotor blades advantageously three rotor blades, and that the gyroscope placed in each electrical pitch drive system register an angle value of the connected rotor blades in relation to gravity, and a communication bus system compares received values—a first position—of each angle registered between gravity and the center axis of the rotor blade received from the gyroscope connected to the rotor blade in question; and the difference between the received values results in an orientation/position of each rotor blade in relation to the neighboring rotor blades and that a processor calculates an optimal pitching of each rotor blade in accordance with the orientation/position.

According to another aspect of the invention the electrical pitch drive system further comprises an accelerometer, and the accelerometer register the angular velocity of the rotor blade attached to the electrical pitch drive system when it is rotating, and a processor adapts the values of the velocity, and the electrical pitch drive system pitches the rotor blades in accordance with the values in order to optimize the velocity of the rotor blades.

According to another aspect of the invention at least one gyroscope is attached immovably to each of the rotor blades and that the gyroscopes in the electrical pitch drive system communicates with the gyroscopes placed on the rotor blade the electrical pitch drive system in question regulates whereby the gyroscopes are calibrated, and making a calibration of the blade position possible without extensive geometrical measurements.

According to another aspect of the invention at least one accelerometer is placed immovably to each rotor blade and the gyroscope placed on the rotor blade communicates with the accelerometer placed on the same rotor blade, and by the communications an optimized pitch angle is obtained, as the accelerometer compensates the drift of the gyroscope.

The amplitude of the gyroscope signal is drifting because of the technology. The gyroscope signal is by far more stable than for instance an accelerometer signal, as the higher frequencies are filtered out compared to the accelerometer signal. However, the amplitude of the accelerometer is more stable than the amplitude signal of the gyroscope, giving a unique combination.

BRIEF DESCRIPTION OF THE DRAWINGS

FIG. 1 is a perspective view of an exemplary wind turbine 14 that includes a nacelle 16 housing a generator (not shown in FIG. 1). The nacelle 16 is mounted on a top of a tall tower 18, only a portion of which is shown in FIG. 1. The wind turbine 14 also includes a rotor assembly that includes a plurality of rotor blades 17 attached to a rotating hub 15. There are no specific limits on the number of rotor blades 17 required by the present invention. Wind turbine 14 includes a main control system 7—FIG. 2—that is configured to perform overall system monitoring and control including pitch and speed regulation, high-speed shaft and yaw brake application, yaw and pump motor application and fault monitoring. This is explained below with reference to FIG. 2.

FIG. 2 shows a pitch control system 1 comprising 3 separate electrical pitch drive systems 3 and a number of units comprising a slip ring 4". The pitch control system 1 is adapted to a plant adapted to drive a wind turbine 14 comprising 3 rotor blades 17 as shown in FIG. 1. Each electrical pitch drive systems 3 is connected to a pitch motor 2 and an energy supply in the form of replaceable batteries 6. The electrical pitch drive system is attached immovable to the hub 15.

Figure 1:
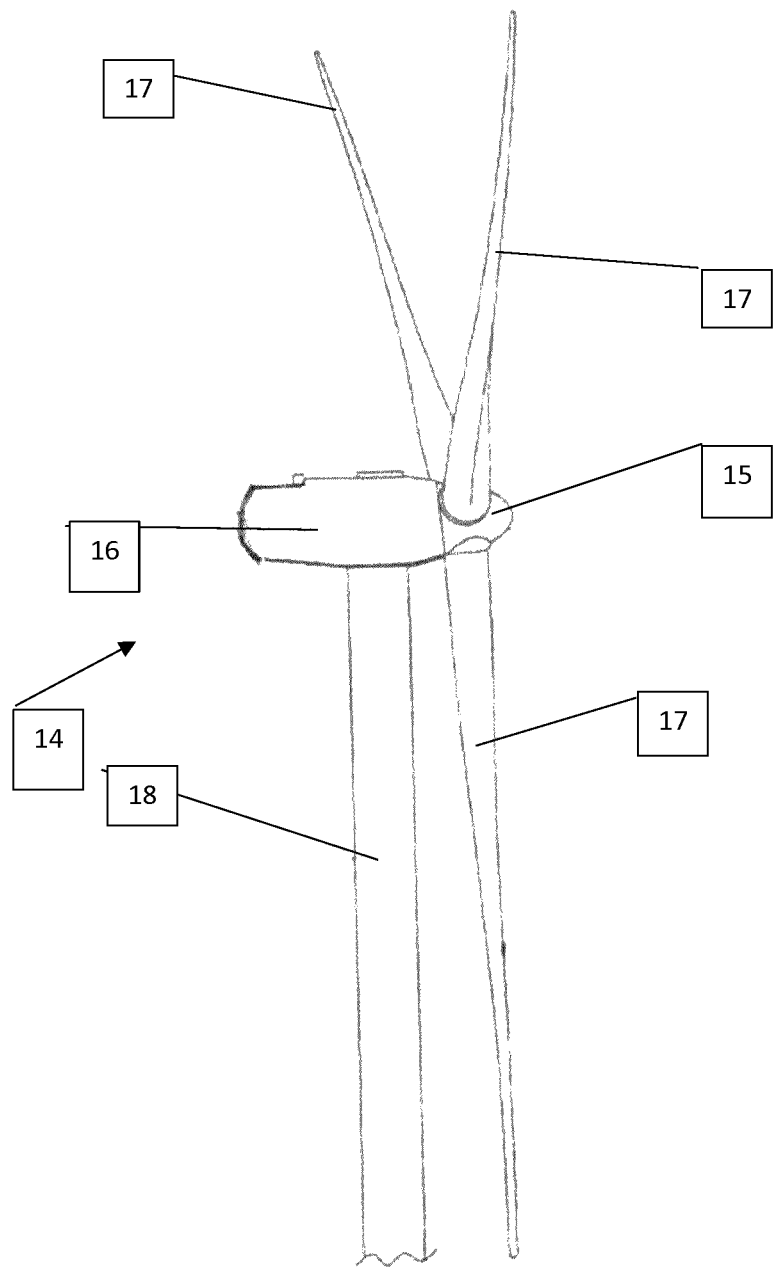
FIG. 1 is a perspective view of an exemplary wind turbine

The pitch control system 1 communicates with a slip ring 4", which is a unit that transfers electrical signals from a fixed unit (the nacelle 16) to the rotating part the hub 15. The nacelle comprises a main-controller 7 and a EL supply network 5.

Each electrical pitch motor 2 moves/pitches the rotor blade it is connected to. There are two main features for the pitch control system 1, one is the normal operation, where the pitch is used to optimize the lift of the rotor blade 17 in all wind situations, and the other is the main brake of the wind turbine 14.

This brake function is simple as the turbine blade is moved/pitched from the operation point (from 0° to 30° depending on the actual average wind speed) to vane position, this is 90°.

As the pitching of the rotor blades is the only brake for the wind turbine the three pitch motors 2 have to be controlled individually and independent from each other. This is done by the electrical pitch drive system 3.

For each of the three pitch drives 3, the pitch angle is measured redundantly, as there is a second sensor 20—a resolver/encoder—on the motor shaft 40 of the electrical pitch motor 2, and a first sensor (not shown)—an encoder—on the rod of the rotor blade.

The invention provides a sensor comprising at least a gyroscope 22 (see FIG. 4) placed in each electrical pitch drive system 3 and attached immovable to this.

A gyroscope 22 is a device that uses Earth's gravity to help determine orientation. Its design may comprise a freely rotating rotor, mounted onto a spinning axis in the center of a larger and more stable wheel. As the axis turns, the rotor remains stationary to indicate the central gravitational pull, and thus which way is "down."

Figure 3:
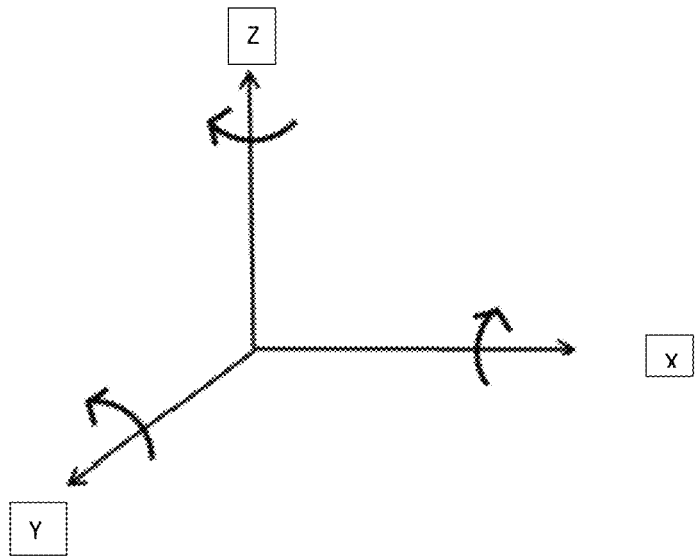
FIG. 3 shows 3 axes X-axis, Y-axis and Z-axis used in a gyroscope according to the invention.

FIG. 3 shows the three axes used in a gyroscope: the three axes are perpendicular to each other. The gyroscope is able to measure the rotation around each of the axes: the X-axe, the Y-axe and the Z-axe. The arrows are showing the rotation direction. When the gyroscope is placed in an electrical pitch drive systems 3 the orientation of the rotor blade in relation to the gravity vector is determined.

If the sensor comprises a gyroscope 22 combined with an accelerometer the accelerometer will measure the acceleration in the direction of the x, y and z vector. In this case, the sensor placed in the electrical pitch drive system 3 is a combined sensor.

An accelerometer is a device designed to measure non-gravitational acceleration. When the accelerometer is integrated into the gyroscope, it is thereby an integrated part of the electrical pitch drive system 3. When the system due to rotation of the hub goes from a standstill to any velocity, the accelerometer is designed to respond to the vibrations associated with such movement. It uses microscopic crystals that go under stress when vibrations occur, and from that stress, a voltage is generated to create a reading on any acceleration. The accelerometer then compensate for the drift of the gyroscope.

Figure 4:
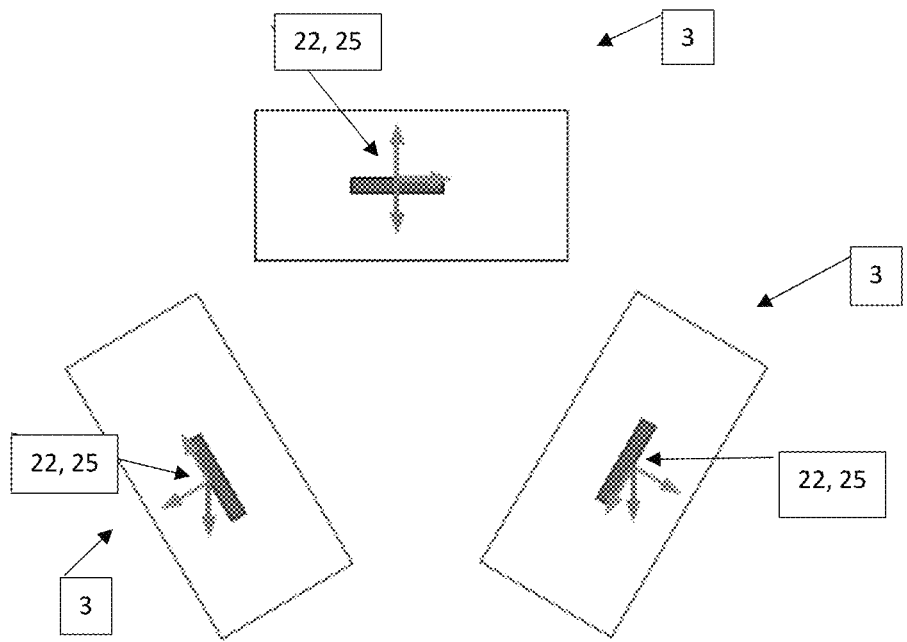
FIG. 4 shows placement of three gyroscopes in three electrical pitch drive systems according to the invention.

FIG. 4 shows placement of 3 gyroscopes 22 in 3 electrical pitch drive systems 3 and the orientation of the X,Y,Z vectors shown in FIG. 3. The sensor may be a combined sensor also comprising the accelerometer 25. As each of the electrical pitch drive system 3 is connected to a rotor blade (not shown) the three electrical pitch rive systems 3 and thereby the three gyroscopes (and perhaps the accelerometer 25) are spaced 120° apart from each other.

Figure 5:
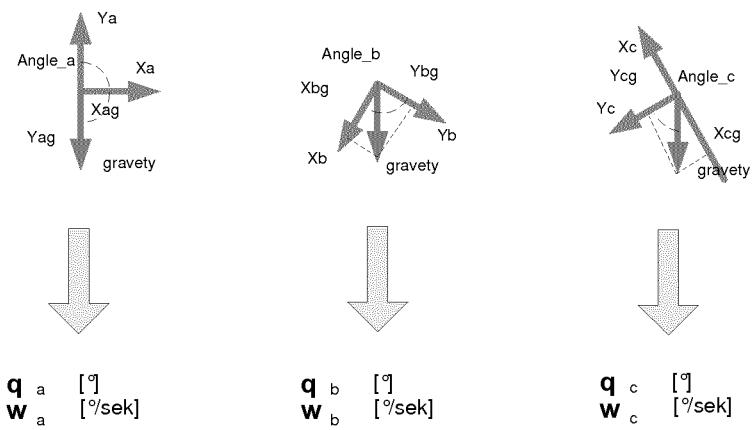
FIG. 5 shows the position of the three gyroscopes in a wind turbine hub according to the invention.

In FIG. 5 the position of the three gyroscopes in the wind turbine hub is shown. Each of the gyroscopes gives the following result:

| | |
|---|---|
| Ya, Yb, Yc: | Vector in the y-axis for an electrical pitch drive system |
| Xa, Xb, Xc: | Vector in the X-axis for an electrical pitch drive system |
| Yag, Ybg, Ycg | Vector component from gravitation |
| Xag, Xbg, Xcg | Vector component from gravitation | a,b,c represent each an electrical pitch drive system.
The arithmetic calculation gives the following result:
qa, qb, qc: Angles between the central axis of a rotor blade and the gravity vector for each of the three gyroscopes which is equivalent to the angle of each of the three blades. [°]

The arithmetic describing the transition from the physical properties and to the angle is not described here.

Figure 6:
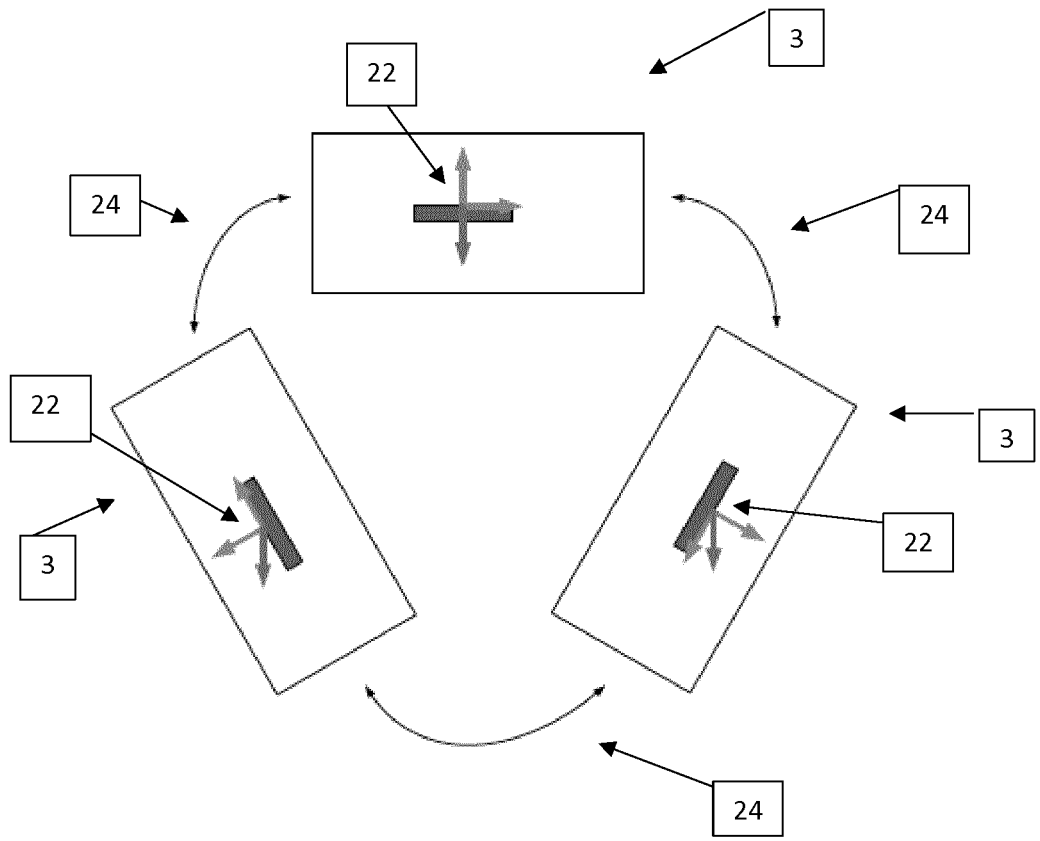
FIG. 6 shows a communication between the three separate electrical pitch drive systems according to the invention.

FIG. 6 shows a communication between the 3 separate electrical pitch drive systems 3. The three rotor blades angle relative to gravity and are gathered via an internal bus system 24 between the three electrical pitch drive systems 3. The bandwidth of the bus 24 is lower than 50 ms, which gives a reliable position result. The three electrical pitch drive systems 3 are placed in the hub in close vicinity of the rotor blades. The bus communication 24 may be a part of the overall control system. This new communication line may be used for other purposes as well, for instance the safety system.

By comparing the three angles of the three electrical pitch drive systems, a new angle of the rotor blades can be calculated. This is shown below and with reference to FIG. 8.

Figure 7:
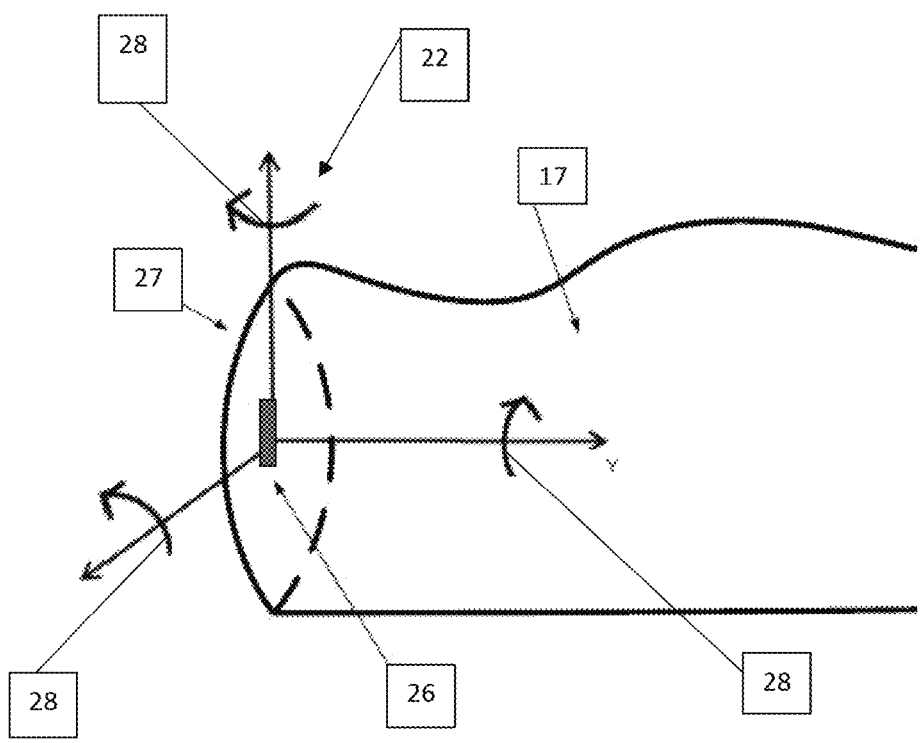
FIG. 7 shows the position of a gyroscope in relation to a rotor blade.

FIG. 7 shows the position of the gyroscope 22 in relation to a rotor blade 17. The gyroscope 22 is placed in the electrical pitch drive system 3. Orientation measurement of each electrical pitch drive system is based on the gyroscope signal shown with an arrow 28. The electrical pitch drive system 3 is placed in a fixed distance from the centerline of rotation 26 of the hub and near the rod 27 of the rotor blade 17. The gyroscope 22 measurement is based on the gravitational force. Therefor the position of the electrical pitch drive system 3 in relation to the rotational center of the pitching of the rotor blade is not relevant.

The orientation measurement is based on the signal from the gyroscope 22. If an accelerometer is incorporated, the signal from the accelerometer is used for correction of the amplitude from the gyroscope. One of the disadvantages of the gyroscope is that the signal is drifting and the accelerometer may compensate for that.

Figure 8:
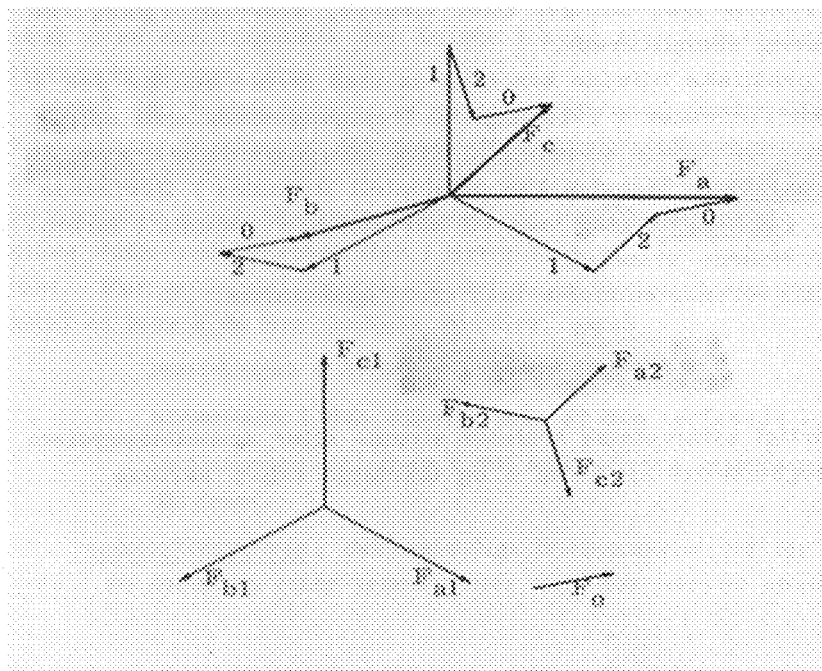
FIG. 8 shows a vector-diagram for three vectors.

FIG. 8 shows a vector-diagram
Where:
Fa, Fb, Fc The measured vectors showing the orientation of each rotor blade, three phase system, where all vectors can have any amplitude or phase angle.

Fa1, Fb1, Fc1: The synchronous components, three-phase system where the amplitude for all three vectors are displaced 120° and the amplitude is the same for all three vectors.

Fa2, Fb2, Fc2: The asymmetrical vectors three-phase system with the same properties as the synchronous components, but with an opposite rotational direction. The asymmetrical vectors are relevant when the rotor blades are not displaced 120° (that is optimal position) in relation to each other.

F0: The zero component, a constant that has no rotation and a constant amplitude.

The equations are as follows:

$$F_a = F_{a1} + F_{a2} + F_0$$

$$F_b = F_{b1} + F_{b2} + F_0 = F_{a1} \cdot a^2 + F_{a2} \cdot a + F_0$$

$$F_c = F_{c1} + F_{c2} + F_0 = F_{a1} \cdot a + f_{a2} \cdot a^2 + F_0$$

The vector components are when recalculated:

$$F_{a1} = \frac{1}{3}(F_a + F_b \cdot a + F_c \cdot a^2)$$

$$F_{a2} = \frac{1}{3}(F_a + F_b \cdot a^2 + F_c \cdot a)$$

$$F_0 = \frac{1}{3}(F_a + F_b + F_c)$$

This is the same for all three phases.
a: The vector length is a unity length and have a 120° displacement clockwise.
$a^2$: The vector length is a unity length and have a 240° displacement clockwise.

The mathematical theory can be used as a filter; the synchronous component is the component that gives the exact value for all three acceleration components.

The inverse component is a description of the minor differences between the axes. The zero component is a number of structural movements/acceleration that is the same for all three axes. As the three sensors are in the same hub, this could be a tower vibration. The equation shows the filtering that may take place by using an accelerometer in combination with the gyroscope.

The synchronous vector components are recalculated with a fixed time interval in the interval from 1 to 100 ms. This has to be done with a fixed time interval. Thereby it is possible to analyze on tower vibration and other physical issues.

With this data, the structural movement of the hub can be calculated, the structural movements is the 0-component, this is a component that is the same for all three vectors Fa, Fb and Fc that is for each of the rotor blades. The structural measurements could be: Tower vibration, tower bending and asymmetrical loads for the rotor.

Figure 9:
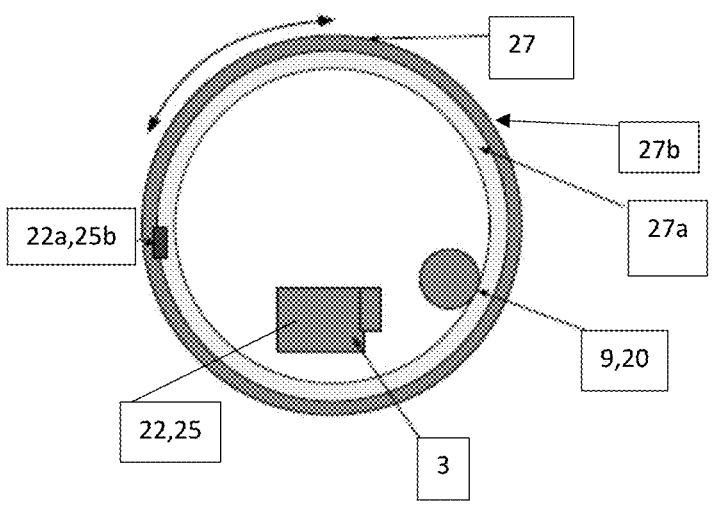
FIG. 9 shows the placement of a sensor on the pitch-able part of a rotor blade.

FIG. 9 shows placement of a sensor on the pitchable part of a rotor blade. The blade is seen from the bottom side.

Prior art discloses that each of the three pitch drives measure the pitch angle as there is a second sensor—a resolver—placed on the motor shaft, and a first sensor—an encoder—placed on the blade rod. The encoder is placed on a fixed part and comprises a small tooth wheel rotating with the pitch tooth wheel. The encoder hereby gives a redundant measurement of the pitch angle.

Typical the encoder is very precise, but the mechanical construction of the wheel and the material chosen, gives a slack of approximately 0.5°.

The blade rod 27 has a fixed part 27a and a rotational part 27b, which is moved and controlled by the pitch system 3.

The encoder is according to the present invention exchanged with a blade rod sensor namely a rotor gyroscope 22a and advantageously a rotor accelerometer 22b is combined with the rotor gyroscope 22a. This blade rod sensor is placed at the blade rod 27 of the rotor blade and immovable in relation to the rod. Several sensors according to the invention may be placed at the rod and/or along with the longitudinal direction of the rotor blade. As the pitch angle is variating, the blade rod sensor 22a, 22b placed on the blade is moved relative to the electrical pitch drive system 3 and the gyroscope 22 and advantageously the accelerometer 25 placed in the electrical pitch drive system 3. The sensors shall be calibrated to the exact value of the 0-position. Placing a rotor gyroscope 22a at the rod of the rotor blade makes it possible to eliminate the encoder placed in relation to the pitch tooth wheel. This part of the invention introduces an additional sensor that is replacing the redundant encoder.

The new sensor is mounted on the rotor blade and is fixed in the orientation of the blade.

Figure 2:
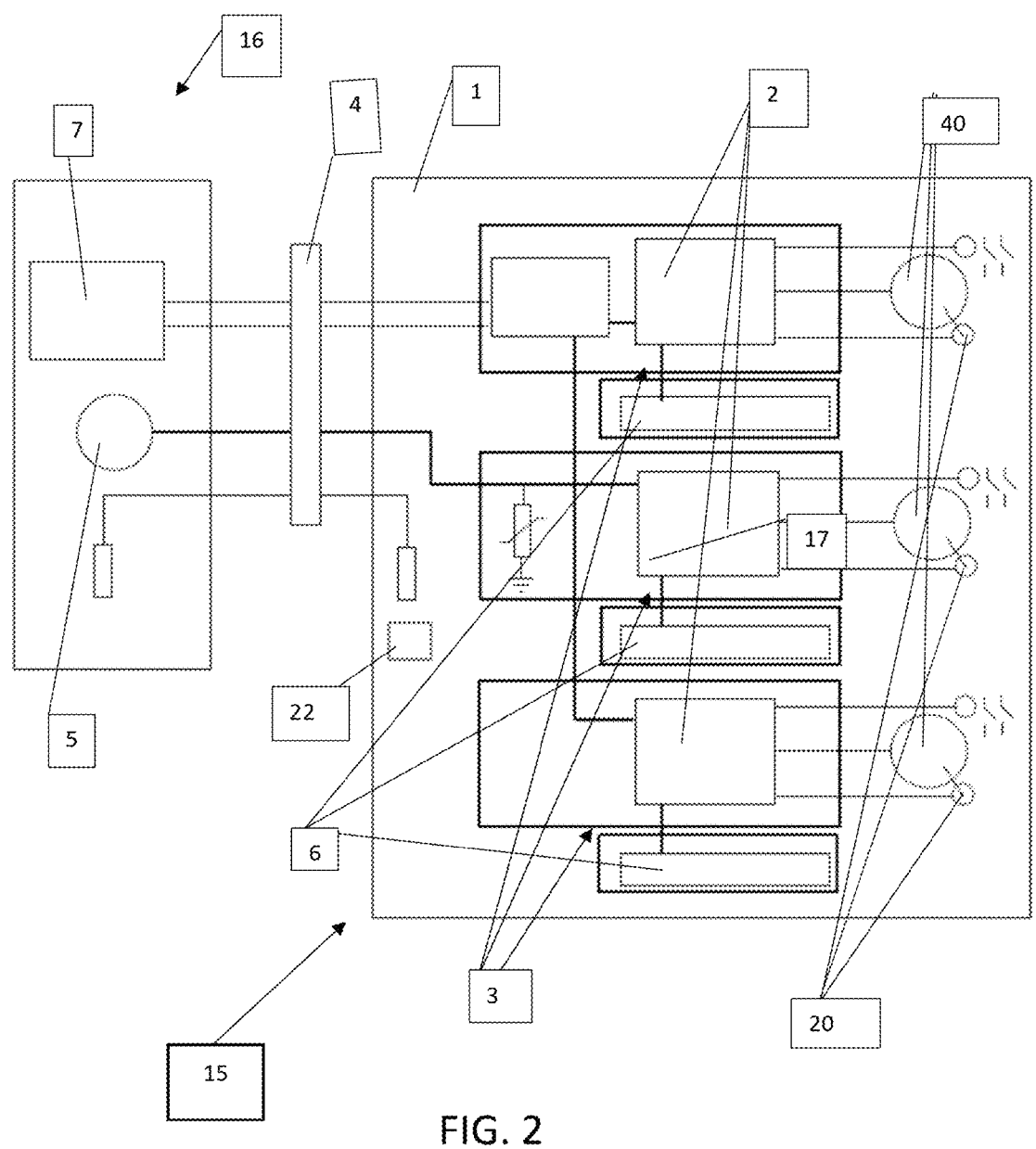
FIG. 2 shows an electrical pitch control system comprising three separate electrical pitch drive systems and a number of units.

The sensor, rotor gyroscope 22a, will indicate a pitch angle directly. Each blade has this new sensor, rotor gyroscope 22a, and the three units are operating individually, as the three blades have to operate individually. The measured angle is transmitted via a bus system—for instance SSI—to the electrical pitch drive system 3 where the value is evaluated and compared with angle measured on the motor shaft 9 by the second sensor, rotor sensor 20 shown in FIGS. 2 and 9.

A clear advantage of the new sensor, rotor gyroscope 22a, rotor accelerometer 22b is that the sensor is attached to the blade and the absolute position of the blade can be measured. Another advantage is that the sensor comprising a rotor gyroscope and rotor accelerometer has no movable parts; hence, the wear of this is limited.

The invention claimed is:

1. An electrical pitch control system for controlling rotor blades of a wind turbine comprising:
   a nacelle and a hub both arranged on a top of a tower, said hub is configured to rotate around an axis, and first, second and third rotor blades each pivotably mounted on the hub;
   a processor;
   the first rotor blade having an associated first electrical pitch drive system disposed inside the hub, the first electrical pitch drive system is connected to the processor, and the first electrical pitch drive system comprising a first gyroscope configured to register a first angle value of a longitudinal axis of the first rotor blade with respect to earth gravity, the first angle value is an angle between a first gravity vector and a first perpendicular vector that is perpendicular to the first gyroscope, wherein the first perpendicular vector is aligned with a center axis of the first rotor blade;
   a first electrical pitch motor configured to adjust a pitch of the first rotor blade;
   the second rotor blade having an associated second electrical pitch drive system disposed inside the hub, the second electrical pitch drive system is connected to the processor, and the second electrical pitch drive system comprising a second gyroscope configured to register a second angle value of a longitudinal axis of the second rotor blade with respect to earth gravity, the second angle value is an angle between a second gravity vector and a second perpendicular vector that is perpendicular to the second gyroscope, wherein the second perpendicular vector is aligned with a center axis of the second rotor blade;
   a second electrical pitch motor configured to adjust a pitch of the second rotor blade;
   the third rotor blade having an associated third electrical pitch drive system disposed inside the hub, the third electrical pitch drive system is connected to the processor, and the third electrical pitch drive system comprising a third gyroscope configured to register a third angle value of a longitudinal axis of the third rotor blade with respect to earth gravity, the third angle value is an angle between a third gravity vector and a third perpendicular vector that is perpendicular to the third gyroscope, wherein the third perpendicular vector is aligned with a center axis of the third rotor blade; and
   a third electrical pitch motor configured to adjust the pitch of the third rotor blade, wherein the first gyroscope is immovable in relation to the first electrical pitch drive system, the first electrical pitch drive system is immovable in relation to the hub and rotates with rotation of the hub around the axis so that deflection of the first blade is not detected by the first gyroscope, the second gyroscope is immovable in relation to the second electrical pitch drive system, the second electrical pitch drive system is immovable in relation to the hub and rotates with rotation of the hub around the axis so that deflection of the second blade is not detected by the second gyroscope, the third gyroscope is immovable in relation to the third electrical pitch drive system, the third electrical pitch drive system is immovable in relation to the hub and rotates with rotation of the hub around the axis so that deflection of the third blade is not detected by the third gyroscope, and the first, second and third gyroscopes are each in a fixed distance from the axis of rotation of the hub, and
   wherein the processor is configured to calculate a rotational velocity of the hub based on the first, second and third angle values and adjust the rotational velocity of the hub by adjusting pitches of the first, second and third rotor blades.

2. The electrical pitch control system according to claim 1, wherein the first electrical pitch control system is connected to the processor by a communication bus system configured to gather received values of each first angle value registered between gravity and the center axis of the first rotor blade received from the first gyroscope, the second electrical pitch control system is connected to the processor by the communication bus system configured to gather received values of each second angle value registered between gravity and the center axis of the second rotor blade received from the second gyroscope, the third electrical pitch control system is connected to the processor by the communication bus system adapted to gather received values of each third angle value registered between gravity and the center axis of the third rotor blade received from the third gyroscope, and a difference between the received first, second, and third angle values is determined by the processor using an algorithm, and the processor is configured to calculate an angular position of the first rotor blade in relation to the second and third rotor blades, calculate an angular position of the second rotor blade in relation to the first and third rotor blades, and an angular position of the third rotor blade in relation to the first and second rotor blades.

3. The electrical pitch control system according to claim 1, wherein the first electrical pitch drive system comprises as first accelerometer configured to register acceleration of the first rotor blade, the second electrical pitch drive system comprises a second accelerometer configured to register acceleration of the second rotor blade, and the third electrical pitch drive system comprises a third accelerometer configured to register acceleration of the third rotor blade.

4. The electrical pitch control system according to claim 1, further comprising a first rotor gyroscope attached to the first rotor blade configured to measure pitch of the first rotor blade, a second rotor gyroscope attached to the second rotor blade configured to measure pitch of the second rotor blade, a third rotor gyroscope attached to the third rotor blade configured to measure pitch of the third rotor blade, and the first, second and third rotor gyroscopes are in communication with the processor.

5. The electrical pitch control system according to claim 4, further comprising a first rotor accelerometer attached to the first rotor blade configured to measure acceleration of the first rotor blade, a second rotor accelerometer attached to the second rotor blade configured to measure acceleration of the second rotor blade, a third rotor accelerometer attached to the third rotor blade configured to measure acceleration of the third rotor blade, and the first, second and third rotor accelerometers are in communication with the processor.

6. The electrical pitch control system according to claim 4, further comprising a first rotor sensor, wherein the first rotor sensor and the first rotor gyroscope are each configured to detect data of a pitch angle of the first rotor blade, and that the first electrical pitch drive system is configured to change the pitch angle of the first rotor blade by controlling the first motor when data from the first rotor sensor is different from the data from the first rotor gyroscope sensor,
a second rotor sensor, wherein the second rotor sensor and the second rotor gyroscope are each configured to detect data of a pitch angle of the second rotor blade, and the second electrical pitch drive system is configured to change the pitch angle of the second rotor blade by controlling the second motor when data from the second rotor sensor is different from data from the second rotor gyroscope sensor, and
a third rotor sensor, wherein the third rotor sensor and the third rotor gyroscope are each configured to detect data of a pitch angle of the third rotor blade, and the third electrical pitch drive system is configured to change the pitch angle of the third rotor blade by controlling the third motor when data from the third rotor sensor is different from data from the third rotor gyroscope sensor.

7. The electrical pitch control system according to claim 1, wherein the first force vector is 120° offset with respect to the second force vector, and the second force vector is 120° offset with respect to the third force.

8. A method for operating first, second and third rotor blades of a wind turbine comprising:
a nacelle and a hub both arranged on a top of a tower, said hub is configured to rotate around an axis, and first, second and third rotor blades each pivotably mounted on the hub;
a processor;
the first rotor blade having an associated first electrical pitch drive system disposed inside the hub, the first electrical pitch drive system is connected to the processor, and the first electrical pitch drive system comprising a first gyroscope configured to register a first angle value of a longitudinal axis of the first rotor blade with respect to earth gravity, the first angle value is an angle between a first gravity vector and a first perpendicular vector that is perpendicular to the first gyroscope, wherein the first perpendicular vector is aligned with a center axis of the first rotor blade;
a first electrical pitch motor configured to adjust a pitch of the first rotor blade;
the second rotor blade having an associated second electrical pitch drive system disposed inside the hub, the second electrical pitch drive system is connected to the processor, and the second electrical pitch drive system comprising a second gyroscope configured to register a second angle value of a longitudinal axis of the second rotor blade with respect to earth gravity, the second angle value is an angle between a second gravity vector and a second perpendicular vector that is perpendicular to the second gyroscope, wherein the second perpendicular vector is aligned with a center axis of the second rotor blade;
a second electrical pitch motor configured to adjust a pitch of the second rotor blade;
the third rotor blade having an associated third electrical pitch drive system disposed inside the hub, the third electrical pitch drive system is connected to the processor, and the third electrical pitch drive system comprising a third gyroscope configured to register a third angle value of a longitudinal axis of the third rotor blade with respect to earth gravity, the third angle value is an angle between a third gravity vector and a third perpendicular vector that is perpendicular to the third gyroscope, wherein the third perpendicular vector is aligned with a center axis of the third rotor blade; and
a third electrical pitch motor configured to adjust the pitch of the third rotor blade,
wherein the first gyroscope is immovable in relation to the first electrical pitch drive system, the first electrical pitch drive system is immovable in relation to the hub and rotates with rotation of the hub around the axis so that deflection of the first blade is not detected by the first gyroscope, the second gyroscope is immovable in relation to the second electrical pitch drive system, the second electrical pitch drive system is immovable in relation to the hub and rotates with rotation of the hub around the axis so that deflection of the second blade is not detected by the second gyroscope, the third gyroscope is immovable in relation to the third electrical pitch drive system, the third electrical pitch drive system is immovable in relation to the hub and rotates with rotation of the hub around the axis so that deflection of the third blade is not detected by the third gyroscope, and the first, second and third gyroscopes are each in a fixed distance from the axis of rotation of the hub, the method comprising:

calculating by the processor a rotational velocity of the hub based on the first, second and third angle values and adjust the rotational velocity of the hub by adjusting pitches of the first, second and third rotor blades using the first, second and third motors.

9. The method for operating at least one rotor blade according to claim 8, wherein the processor compares a first position of each of the first, second and third angle values registered between gravity and the center axis of the first, second and third rotor blades received from the first, second and third gyroscopes and determines a difference between the first, second and third angle values results in an orientation/position of each of the first, second and third rotor blades in relation to the neighboring rotor blades and that the processor calculates pitching of each of the first, second and third rotor blades in accordance with the orientation/position.

10. The method for operating at least one rotor blade according to claim 8, wherein the first electrical pitch drive system further comprises a first accelerometer and that the first accelerometer registers an angular velocity during rotation of the first rotor blade when it is rotating and that the processor adapts the first velocity values from the first accelerometer and that the first electrical pitch drive system pitches the first rotor blades in accordance with the first velocity values in order to adjust the velocity of the first rotor blade.

11. The method for operating at least one rotor blade according to claim 8, wherein the first electrical pitch drive system comprises a first accelerometer configured to register acceleration of the first rotor blade, the second electrical pitch drive system comprises a second accelerometer configured to register acceleration of the second rotor blade, and the third electrical pitch drive system comprises a third accelerometer configured to register acceleration of the third rotor blade, wherein the processor uses first acceleration data from the first accelerometer to compensates drift of the first gyroscope, the processor uses second acceleration data from the second accelerometer to compensate drift of the second gyroscope, and the processor uses third acceleration data from the second accelerometer to compensate drift of the third gyroscope.

12. The method according to claim 8, wherein the wind turbine further comprising,
a first rotor gyroscope attached to the first rotor blade configured to measure pitch of the first rotor blade, a second rotor gyroscope attached to the second rotor blade configured to measure pitch of the second rotor blade, a third rotor gyroscope attached to the third rotor blade configured to measure pitch of the third rotor blade, and the first, second and third rotor gyroscopes are in communication with the processor,
a first rotor sensor, wherein the first rotor sensor and the first rotor gyroscope are each configured to detect data of a pitch angle of the first rotor blade,
a second rotor sensor, wherein the second rotor sensor and the second rotor gyroscope are each configured to detect data of a pitch angle of the second rotor blade, and
a third rotor sensor, wherein the third rotor sensor and the third rotor gyroscope are each configured to detect data of a pitch angle of the third rotor blade, the method further comprising at least one of the following steps,
changing the pitch angle of the first rotor blade by the first electrical pitch drive system by controlling the first motor because data from the first rotor sensor is different from data from the first rotor gyroscope sensor,
changing the pitch angle of the second rotor blade by the second electrical pitch drive system by controlling the second motor because data from the second rotor sensor is different from data from the second rotor gyroscope sensor, or
changing the pitch angle of the third rotor blade by the third electrical pitch drive system by controlling the third motor because data from the third rotor sensor is different from data from the third rotor gyroscope sensor.

13. The method according to claim 8, wherein the rotating first gyroscope indicates a direction of the first rotor blade with respect to earth gravity and the first electrical pitch control system is detecting a direction/angular position of the center axis of the first rotor blade with respect to the tower and parallel to the gravitational vector, the rotating second gyroscope indicates a direction of the second rotor blade with respect to earth gravity and the second electrical pitch control system is detecting a direction/angular position of the center axis of the second rotor blade with respect to the tower and parallel to the gravitational vector, and the rotating third gyroscope indicates a direction of the first rotor blade with respect to earth gravity and the third electrical pitch control system is detecting a direction/angular position of the center axis of the third rotor blade with respect to the tower and parallel to the gravitational vector.

14. The method according to claim 8, further comprising further comprising a first rotor gyroscope attached to the first rotor blade configured to measure pitch of the first rotor blade, a second rotor gyroscope attached to the second rotor blade configured to measure pitch of the second rotor blade, a third rotor gyroscope attached to the third rotor blade configured to measure pitch of the third rotor blade, and the process comparing a first rotor blade pitch determined using the first rotor gyroscope compared to a first rotor blade pitch determined using the firs gyroscope and adjusting the pitch of the first rotor blade to correct a difference in the pitches measured.

* * * * *